(12) United States Patent
Tatarkiewicz et al.

(10) Patent No.: US 10,823,662 B1
(45) Date of Patent: Nov. 3, 2020

(54) SPECIAL PURPOSE CUVETTE ASSEMBLY AND METHOD FOR OPTICAL MICROSCOPY OF NANOPARTICLE COLLOIDS

(71) Applicant: HORIBA Instruments Incorporated, Irvine, CA (US)

(72) Inventors: Jan J. Tatarkiewicz, San Diego, CA (US); Faizan Masood, San Diego, CA (US)

(73) Assignee: HORIBA INSTRUMENTS, INCORPORATED, Irvine, CA (US)

( * ) Notice: Subject to any disclaimer, the term of this patent is extended or adjusted under 35 U.S.C. 154(b) by 0 days.

(21) Appl. No.: 16/793,161

(22) Filed: Feb. 18, 2020

(51) Int. Cl.
*G01N 21/03* (2006.01)
*G01N 15/14* (2006.01)
*G01N 21/11* (2006.01)

(52) U.S. Cl.
CPC ..... *G01N 21/0303* (2013.01); *G01N 15/1436* (2013.01); *G01N 21/11* (2013.01); *G01N 2021/0307* (2013.01)

(58) Field of Classification Search
CPC .............. G01N 21/03; G01N 21/0303; G01N 2021/0307; G01N 15/1436; G01N 15/1404; G01N 21/11; G01N 21/66; B01L 3/502–3/5027
See application file for complete search history.

(56) References Cited

U.S. PATENT DOCUMENTS

| | | | | |
|---|---|---|---|---|
| 4,873,993 | A * | 10/1989 | Meserol | G01N 21/03 600/573 |
| 6,466,316 | B2 * | 10/2002 | Modlin | B82Y 15/00 250/458.1 |
| 9,541,490 | B1 * | 1/2017 | Tatarkiewicz | G01N 15/1404 |
| 10,012,580 | B2 * | 7/2018 | Tatarkiewicz | G01N 13/00 |
| 10,161,852 | B2 * | 12/2018 | Tatarkiewicz | G01N 21/0303 |
| 2003/0153844 | A1 * | 8/2003 | Smith | B01F 15/0237 600/573 |
| 2005/0176135 | A1 * | 8/2005 | Jones | B01L 3/502707 435/287.2 |
| 2015/0031051 | A1 * | 1/2015 | Mohan | G01N 33/56966 435/7.24 |
| 2015/0204788 | A1 * | 7/2015 | Pangarkar | G01N 33/5005 435/39 |
| 2017/0003214 | A1 * | 1/2017 | Tatarkiewicz | G01N 15/1404 |
| 2017/0122860 | A1 * | 5/2017 | Tatarkiewicz | G01N 15/1463 |
| 2017/0343469 | A1 * | 11/2017 | Tatarkiewicz | G01N 21/0303 |
| 2017/0370825 | A1 * | 12/2017 | Tatarkiewicz | G01N 21/03 |
| 2018/0003610 | A1 * | 1/2018 | Tatarkiewicz | G01N 15/1012 |

* cited by examiner

*Primary Examiner* — Violeta A Prieto
(74) *Attorney, Agent, or Firm* — Manuel de la Cerra (57) ABSTRACT

A special-purpose cuvette assembly with features that create a small, restricted volume to minimize bulk movements of liquid and minimize backscattering-induced broadening of light. The special-purpose cuvette assembly enables recording of Brownian movements of nanoparticles in a liquid when it is placed in a suitable optical device comprising a light sheet and an optical microscope attached to a video camera that is oriented in a direction perpendicular to the light-sheet plane.

24 Claims, 12 Drawing Sheets

FIG. 9B
LINE A-A

SPECIAL PURPOSE CUVETTE ASSEMBLY AND METHOD FOR OPTICAL MICROSCOPY OF NANOPARTICLE COLLOIDS

1.0 TECHNICAL FIELD

The present invention relates to a system for detecting and measuring nanoparticles in liquid samples. More particularly, it relates to the design of a chamber for observing the nanoparticles in liquid samples.

2.0 RELATED APPLICATIONS

This application is related to U.S. patent application Ser. No. 15/594,967, filed on Jun. 28, 2016, titled "SPECIAL PURPOSE CUVETTE ASSEMBLY AND METHOD FOR OPTICAL MICROSCOPY OF NANOPARTICLES IN LIQUIDS", now U.S. Pat. No. 10,161,852; to U.S. patent application Ser. No. 15/194,823, filed on Jun. 28, 2016, titled "SPECIAL PURPOSE CUVETTE ASSEMBLY AND METHOD FOR OPTICAL MICROSCOPY OF NANOPARTICLES IN LIQUIDS", now U.S. Pat. No. 9,541,490, which claimed priority as the non-provisional of U.S. Provisional Patent Application No. 62/187,391, filed on Jul. 1, 2015, titled "SPECIAL PURPOSE CUVETTE ASSEMBLY AND METHOD FOR OPTICAL MICROSCOPY OF NANOPARTICLES IN LIQUIDS"; to U.S. patent application Ser. No. 14/730,138, filed on Jun. 3, 2015, titled "NANOPARTICLE ANALYZER", now U.S. Pat. No. 9,645,070; to U.S. patent application Ser. No. 15/018,532, filed on Feb. 8, 2016, titled "MULTI-CAMERA APPARATUS FOR OBSERVATION OF MICROSCOPIC MOVEMENTS AND COUNTING OF PARTICLES IN COLLOIDS AND ITS CALIBRATION", now U.S. Pat. No. 9,909,972; to U.S. patent application Ser. No. 15/293,180, filed on Oct. 13, 2016, titled "APPARATUS AND METHOD FOR MEASUREMENT OF GROWTH OR DISSOLUTION KINETICS OF COLLOIDAL PARTICLES", now U.S. Pat. No. 10,012,580; and to U.S. Provisional patent application Ser. No. 15/634,858, filed on Jun. 27, 2017, titled "METHOD FOR CALIBRATING INVESTIGATED VOLUME FOR LIGHT SHEET BASED NANOPARTICLE TRACKING AND COUNTING APPARATUS", now U.S. Pat. No. 9,857,283; the disclosures of all of which are herein incorporated by reference in their entirety.

3.0 BACKGROUND

Nanoparticles are ubiquitous, by far the most abundant particle-like entities in natural environments on Earth, and are widespread across many applications associated with human activities. There are many types of naturally occurring nanoparticles and man-made (engineered) nanoparticles. Nanoparticles occur in air, aquatic environments, rain water, drinking water, bio-fluids, pharmaceuticals, drug delivery and therapeutic products, and in a broad range of industrial products. Nanoparticles usually occur within polydisperse assemblages, which are characterized by co-occurrence of differently-sized particles.

Given the widespread usage of nanoparticles, the ability to control and accurately characterize their properties may be useful to many applications. Conventional methods for measuring nanoparticle properties include Nanoparticle Tracking Analysis, which uses a microscope and video camera to analyze frames of the recorded videos to track images of light reflected or scattered by the nanoparticles undergoing Brownian motion. The instrument to perform such analysis is usually comprised of a small cell, or cuvette, that enables illumination of a liquid with a very precisely defined, narrow light sheet and observation of scattered light from the nanoparticles, usually at a 90-degree angle to the light sheet. Hence, the cuvette must contain at least two surfaces with minimal light attenuation properties (for example, optical glass). Such cuvettes are widely used in all types of optical measurements in various laboratory instruments, are easily available and have standardized internal dimensions (in the case of the prototype, 10 mm×10 mm×45 mm).

Ideally, there should be no bulk movement of the liquid when the videos are being recorded, so that the only particle motion is pure Brownian motion. However, due to the low thermal conductivity of glass and because of a potentially considerable quantity of energy transmitted from the illuminating beam and absorbed by the liquid and wall of cuvette, one can observe a thermally generated micro-flow of the liquid, regardless of the volume of liquid in a traditional cuvette. Other sources of micro-flows are possible; for example, vibrations of the table on which the instrument is mounted can cause flow, or evaporation of a sample liquid can cool its surface, hence creating temperature gradient that causes flow (convection). Flow can also be induced by stirring the liquid in the cuvette, or by pumping liquids into and out of the cuvette. In these and other induced flow cases, it is always desirable to arrest the flow as quickly as possible for effective and timely particle analysis. Algorithms are available to detect and remove the effects of such bulk liquid movement; however, these algorithms have limitations, and more accurate results are always achieved in the absence of bulk liquid movement.

Another desirable situation for optimal detection and processing of scattered light from nanoparticles in liquids is to minimize or eliminate the backscattering of light from the wall of the cuvette that is opposite to the wall where light enters the cuvette (the back wall). Such backscattering of the incoming light beam typically broadens the illuminated region (thickening of the light sheet that is not fully parallel but rather elliptical), thus creating images that could be partially out of focus for the microscope (fuzzy images), which is not suitable for precise particle tracking. Backscattering-induced broadening has an inherently inconsistent impact on the width of the light sheet and, as such, also causes variability in particle concentration measurements, since the width of the light sheet affects the volume of sample that is being analyzed in each measurement. Secondarily deleterious light scattering effects from other reflective surfaces in the cuvette should also be minimized through the use of light-absorbing materials or coatings (such as black paint).

Another important consideration is compatibility with existing components that accurately hold the cuvette in place relative to the light sheet, control its temperature and enable stirring and or pumping of the liquid. Such stirring and/or pumping facilitates examination of multiple fresh aliquots from the same sample within the cuvette and is easily achieved with a magnetic stirring bar at the bottom of the cuvette driven by an external rotating magnet, or with an external pump.

What is needed, therefore, is an improved system that can minimize movement of the liquid while also mitigating backscattering-induced broadening of the light within the observation region of the cuvette.

4.0 SUMMARY

The apparatus, systems, and methods described herein elegantly solve the movement and light-beam broadening problems and provide other improvements and benefits, as will be apparent to persons of skill in the art. Accordingly, a system for viewing light scattered on nanoparticles is provided. The system includes a light source for generating an electromagnetic energy directed at a cuvette and a sensor for detecting electromagnetic energy at a substantially perpendicular direction to the incoming light direction. The cuvette includes exterior walls and a floor that define a volume, and a portion of the exterior walls is transparent to the electromagnetic energy. The volume contains a suspension fluid and the nanoparticles. The cuvette also has a viewing chamber with upper and lower viewing chamber walls extending from the exterior walls, wherein the upper and lower viewing chamber walls are substantially parallel to each other. The electromagnetic energy is directed into the viewing chamber in a first direction that is parallel to the upper and lower viewing chamber walls. A reflecting structure reflects the electromagnetic energy out of the viewing chamber in a second direction that is parallel to the upper and lower viewing chamber walls, wherein the first direction is opposite to the second direction. A mixing chamber is separated from and in fluid communication with the viewing chamber. A sample introduction port is in fluid communication with the mixing chamber. The sensor is positioned to detect electromagnetic energy in a region adjacent to the reflecting structure perpendicularly to the original light direction.

The reflecting structure may include a first reflecting surface extending from the upper viewing chamber wall to the lower viewing chamber wall at a 45-degree angle, and a second reflecting surface formed in a portion of the upper viewing chamber wall or in a portion of the lower viewing chamber wall. A notch or notches may be formed where the first reflecting surface meets the upper viewing chamber wall, the lower viewing chamber wall, or both.

Alternatively, the reflecting structure may include a reflecting surface extending orthogonally from the upper viewing chamber wall to the lower viewing chamber wall. A notch or notches may be formed where the reflecting surface meets the upper viewing chamber wall, the lower viewing chamber wall, or both.

The mixing chamber may include a mixing stick. The mixing chamber may be larger than the viewing chamber.

The upper and lower viewing chamber walls may have a very low-reflective or non-reflective surface. The transparent portion of the exterior walls may be made of a high-quality optical glass. The exterior walls of the cuvette may also include a second portion that is made of a material that is different from the transparent portion.

The cuvette just described may be formed from a separate insert that is constructed to be inserted into a cuvette. The insert may have a mounting structure adapted to facilitate the insert's installation into and removal from the cuvette.

Additional aspects, alternatives and variations, as would be apparent to persons of skill in the art, are also disclosed herein and are specifically contemplated as included as part of the invention. The invention is set forth only in the claims as allowed by the patent office in this or related applications, and the following summary descriptions of certain examples are not in any way to limit, define or otherwise establish the scope of legal protection.

5.0 BRIEF DESCRIPTION OF THE DRAWINGS

The invention can be better understood with reference to the following figures. The components within the figures are not necessarily to scale, emphasis instead being placed on clearly illustrating example aspects of the invention. In the figures, like reference numerals designate corresponding parts throughout the different views and/or embodiments. It will be understood that certain components and details may not appear in the figures to assist in more clearly describing the invention.

6.0 DETAILED DESCRIPTION

Reference is made herein to some specific examples of the present invention, including any best modes contemplated by the inventor for carrying out the invention. Examples of these specific embodiments are illustrated in the accompanying figures. While the invention is described in conjunction with these specific embodiments, it will be understood that it is not intended to limit the invention to the described or illustrated embodiments. To the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, process operations well known to persons of skill in the art have not been described in detail in order not to obscure unnecessarily the present invention. Various techniques and mechanisms of the present invention will sometimes be described in singular form for clarity. However, it should be noted that some embodiments include multiple iterations of a technique or multiple mechanisms unless noted otherwise. Similarly, various steps of the methods shown and described herein are not necessarily performed in the order indicated, or performed at all in certain embodiments. Accordingly, some implementations of the methods discussed herein may include more or fewer steps than those shown or described. Further, the techniques and mechanisms of the present invention will sometimes describe a connection, relationship or communication between two or more entities. It should be noted that a connection or relationship between entities does not necessarily mean a direct, unimpeded connection, as a variety of other entities or processes may reside or occur between any two entities. Consequently, an indicated connection does not necessarily mean a direct, unimpeded connection, unless otherwise noted.

The following list of example features corresponds with the attached figures and is provided for ease of reference, where like reference numerals designate corresponding features throughout the specification and figures:

a system for viewing light scattered on nanoparticles 10
a light source 15
electromagnetic energy (beam or sheet) 20
a cuvette 25
cuvette volume 26
a cuvette insert 28
a cuvette holder 29
a sensor 30
cuvette exterior walls 35
cuvette floor 40
backscatter reflection 47
minor backscatter broadening region 48
viewing chamber 50
upper viewing chamber wall 51
lower viewing chamber wall 52
first mirror/reflecting surface 55
first direction of electromagnetic energy 56
second direction (opposite) of electromagnetic energy 57
second mirror/reflecting surface 60
mirror slot 60-1
insertable mirror/reflecting surface 60-2
reflecting structure 61
region observed by the microscope 62
rounded mirror/reflecting surface 65
reflection of electromagnetic energy 67
notch 70
reflection of electromagnetic energy 72
mixing chamber 75
fluid communication between mixing chamber and viewing chamber 80
mounting structure (hole, hook) 85
sample introduction port 90
mixing stick 95
low or non-reflective surface 100
transparent portion of exterior walls (high-quality optical glass) 105
second portion of cuvette exterior wall 110
friction-reducing coating 115

The primary objective of the invention is to provide features inside a standard-sized cuvette that prevent or greatly limit liquid flow during recording of videos while still permitting the light sheet to enter the cuvette, and permitting scattered light to exit the cuvette at perpendicular direction while also allowing for stirring of the liquid inside the cuvette. The objective has been achieved through two parallel surfaces arranged so that they straddle the incoming light sheet and enable recording of scattering light in a perpendicular direction. Additionally, a mirror is placed in the path of the light sheet between the field of view of the video camera and the back wall of the cuvette so as to (1) increase the illumination of the particles and (2) help equalize the thermal gradient so as to mitigate thermal drift of the particles.

The manufacture of these special-purpose cuvettes can be accomplished in at least two ways. One option is to produce inserts that are placed inside standard commercially-available glass cuvettes. Another option is to have the features molded into a cuvette that may be primarily made from plastic but has two optical glass windows molded into a side of the cuvette. Such a construction may reduce costs by minimizing the use of expensive materials such as optical grade glass. The following figures will more fully describe the innovation.

Figure 1:
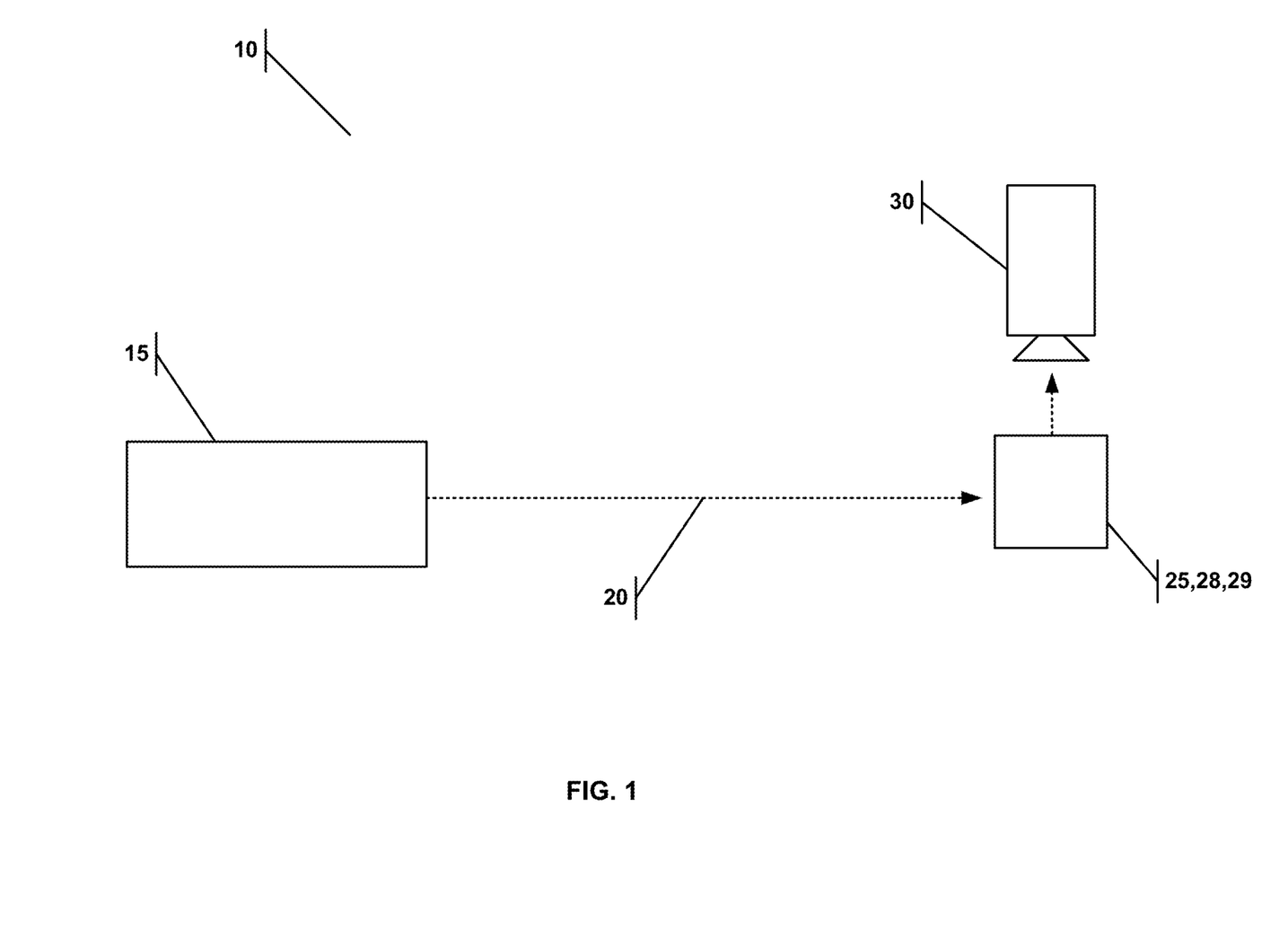
FIG. 1 illustrates a system for detecting nanoparticles using electromagnetic energy scattered on these particles.

FIG. 1 illustrates a conventional laboratory setup with a system 10 to observe the Brownian movement of nanoparticles. A light source 15, generally a laser with associated optics (not shown) produces electromagnetic energy 20 (a light beam or light sheet) that enters the cuvette 25. The cuvette 25 contains a liquid along with the nanoparticles (colloid). A sensor 30, which may include a microscope or camera (not shown), records the image from the cuvette 25, perpendicular to the direction of the electromagnetic energy 20. The cuvette 25 is held in place by a holder 29 that prevents movement of the cuvette to reduce motion-induced blurring and to produce better images, allowing temperature measurement and stabilization if needed.

Figure 2:
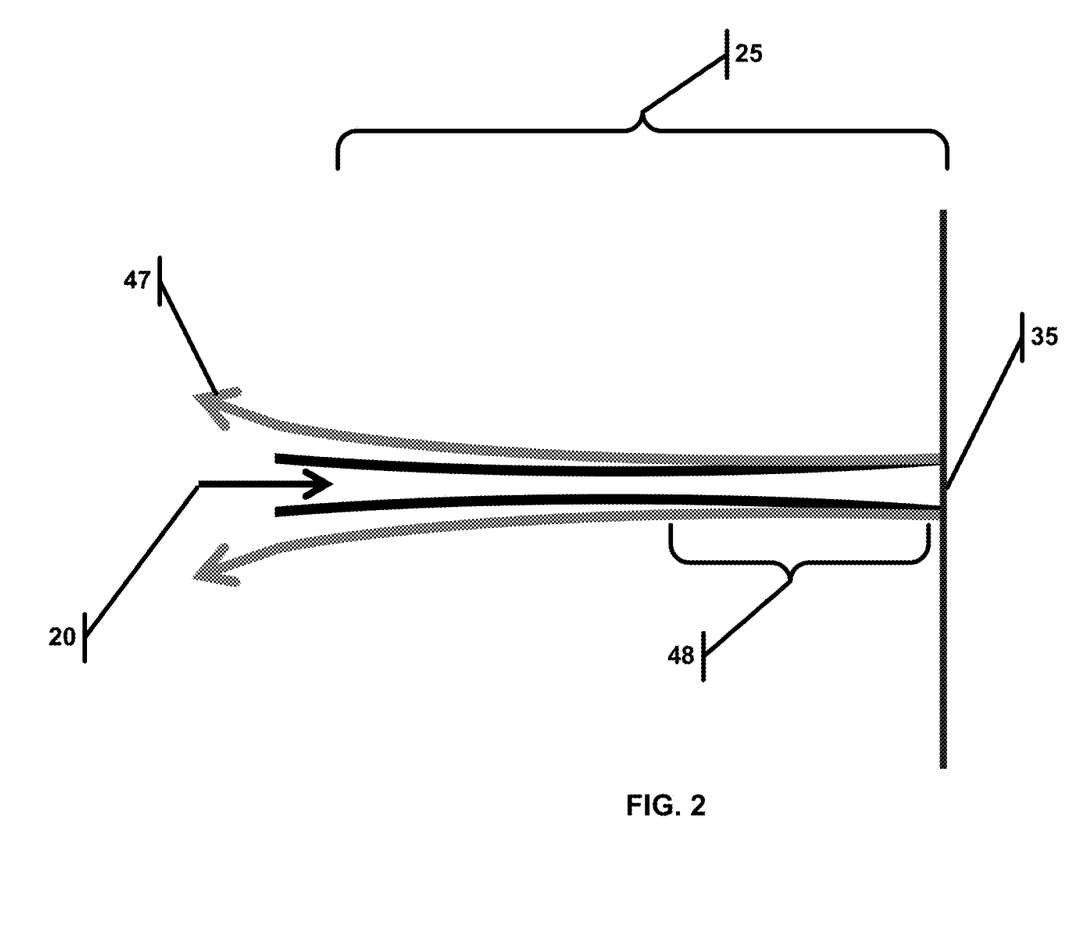
FIG. 2 illustrates the backscatter effect that causes blurry images and volume uncertainty.
Figure 3:
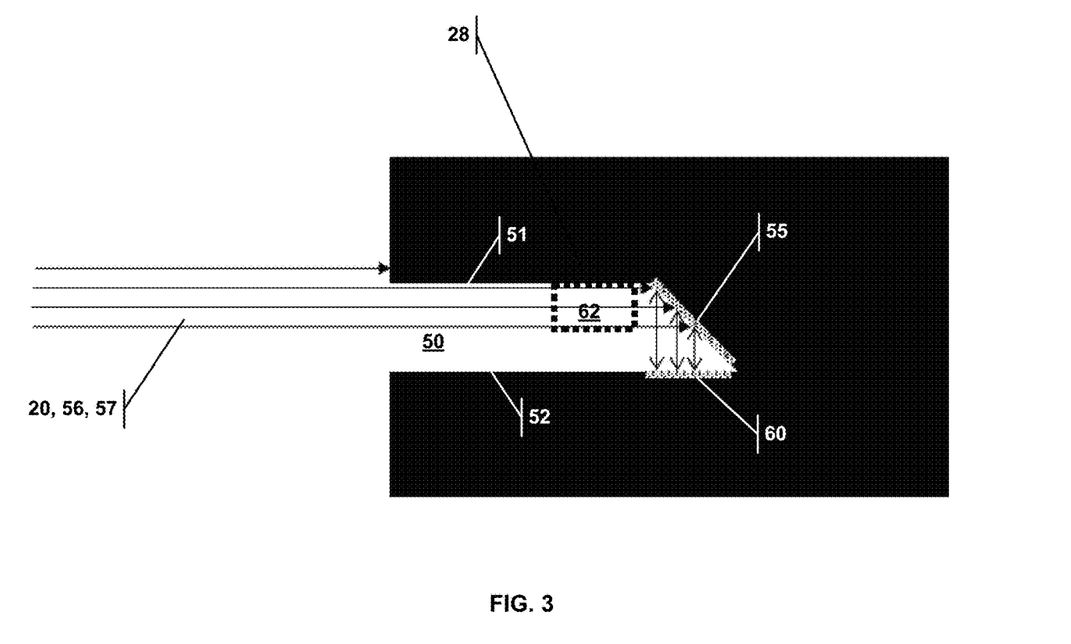
FIG. 3 illustrates a partial side view of the unique cuvette insert (point of view of a detector).

FIG. 2 illustrates the backscatter effect that may cause blurry images. The electromagnetic energy 20 enters the cuvette 25 and hits the cuvette exterior wall 35, causing the backscattered electromagnetic energy 20 to become less focused and thickened. This backscatter reflection is shown by arrows 47. When this less-focused light sheet hits the nanoparticles, the images captured by the sensor 30 may become blurred. While processing techniques exists to de-blur the images to some extent, the blurred images can and do lead to inaccurate analysis of Brownian motion, also changing the observed volume of colloid. But in close proximity to a reflecting surface (i.e., the minor backscatter broadening region 48), the broadening is not substantial relative to the specifications of the equipment used. In a practical realization of a light sheet generated by a cylindrical lens and an objective, the change of the light sheet around its narrowest point should not be bigger than the depth of field (DOF) of the microscope used to visualize nanoparticles—typically, the narrowest point is about 50 microns thick, while at the distance of 3 mm off the center of narrowest point, it is no wider than 60 microns, as tested with different diluents (different refractive indices). The DOF of a typical 20× microscope is between 50 and 60 microns (this is a subjective measurement, as images become more and more fuzzy when one moves off the center of the focus). Therefore, instead of directing the light sheet off the investigated volume, it should be redirected back to illuminate sample again. This can be done by a simple combination of a single 90-degree mirror, or a combination of two mirror surfaces, as shown in FIG. 3, where the region observed by the microscope 62 is placed near the 45-degree mirror. More mirrors may be used without deviating from the spirit of this disclosure. Moreover, the terms mirror/reflecting surface and reflecting structures are intended to cover mirrors made of glass with metallization on the back, highly polished metal mirrors and other highly reflective surfaces. Optimally, the mirror/reflecting surface or reflecting structure is constructed to reflect at least 95% and, more optimally, at least 99% of incident electromagnetic radiation.

Since the light scattered back by the mirrors illuminates only a slightly wider area than that illuminated by the initial light sheet, one effectively gets a doubling of the light intensity available for the so-called dark background microscopy. What is even more beneficial in the case of slightly light-absorbing particles, is that the two portions of the light sheet have opposite directions, and hence they tend to heat opposite sides of particles, thus mitigating drift due to water expansion near the warm surface of particles.

FIG. 3 illustrates a viewing chamber 50 of the present invention, which may be molded into the construction of a cuvette 25 or, alternatively, may be constructed as a cuvette insert 28 that fits snugly into a cuvette of standard dimensions, so that electromagnetic energy 20 may penetrate a wall 35 of the cuvette 25 and enter the viewing chamber 50. The viewing chamber 50 comprises an upper viewing chamber wall 51 that extends from the exterior walls 35 of the cuvette 25 and a lower viewing chamber wall 52 that also extends from the exterior wall of the cuvette 25. Both the upper and lower viewing chamber walls 51, 52 are substantially parallel to each other, and the electromagnetic energy 20 is directed into the viewing chamber 50 in a first direction 56 that is parallel to the upper and lower viewing chamber walls 51, 52. The viewing chamber 50 is also comprised of a reflecting structure 61 that is constructed to reflect the electromagnetic energy 20 out of the viewing chamber 50 in a second direction 57 that is parallel to the upper and lower viewing chamber walls 51, 52 but is opposite to the first direction 56 from which the electromagnetic energy 20 entered. In FIG. 3, the reflecting structure is comprised of a first reflecting surface 55 that extends from the upper viewing chamber wall 51 to the lower viewing chamber wall 52 at a 45-degree angle, and a second reflecting surface 60 formed in a portion of the lower viewing chamber wall 52. The upper and lower viewing chamber walls 51, 52 should have a very low-reflective surface or a non-reflective surface. They may be painted black or coated with a layer of non-reflective material.

Electromagnetic energy 20 travels from the exterior walls 35 of the cuvette 25, travels into the viewing chamber 50 in a direction parallel to the chamber walls 51, 52, strikes the first reflecting surface 55, which may be a mirror, and is angled at 45 degrees from the direction 56 of the incident energy 20, and the energy 20 is thus reflected onto the second reflecting surface 60, which may also be a mirror, that comprises a portion of the lower viewing chamber wall 52. When the energy 20 hits the second reflecting surface 60, it is reflected from the second reflecting surface 60 to the first reflecting surface 55, which reflects it out of the viewing chamber 50 in a direction 57 that is parallel to the chamber walls 51, 52 but opposite its incident direction 56. Thus, the energy 20 enters into the viewing chamber 50 and leaves the viewing chamber 50 parallel to the chamber walls 51, 52.

Figure 4A:
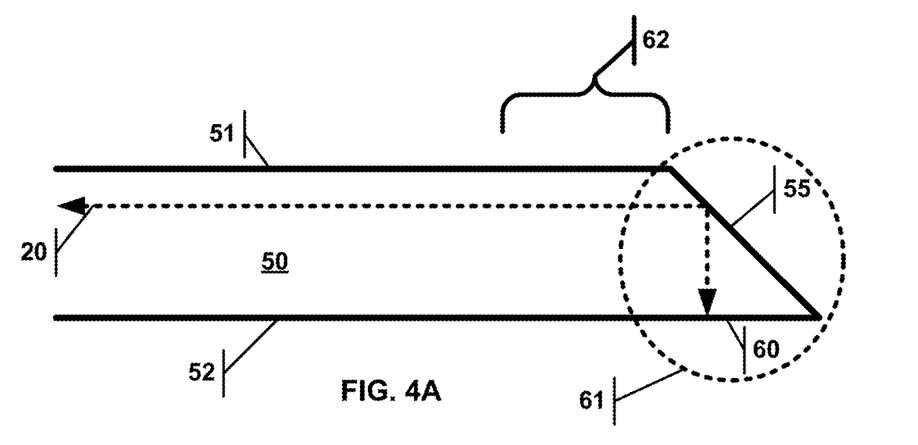
FIG. 4A illustrates a reflecting structure using a mirror placed at 45 degrees relative to the direction of incident light, and a mirror placed in parallel to the direction of incident light.

FIG. 3 illustrates one possible embodiment of the reflecting structure 61, the same embodiment shown in FIG. 4A with a single beam of electromagnetic energy 20. In FIGS. 3 and 4A, the second reflecting surface 60 is formed into the lower viewing chamber wall 52, making the lower viewing chamber wall 52 longer than the upper viewing chamber wall 51. The region 62 the sensor 30 of the system 10 would observe is located away from the corners but also adjacent to the reflecting structure 61, where the electromagnetic energy 20 is only traveling parallel to the viewing chamber walls 51, 52 with only a minor degree of backscatter broadening.

Figure 4B:
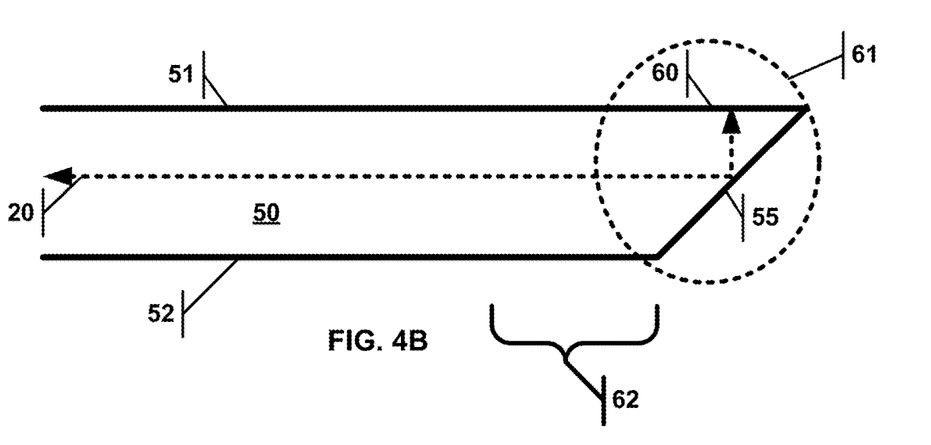
FIG. 4B illustrates a reflecting structure using a mirror placed at 45 degrees relative to the direction of incident light, and a mirror placed in parallel to the direction of incident light.

FIG. 4B shows an alternative embodiment, where the second reflecting surface 60 is formed into the upper viewing chamber wall 51, making the upper viewing chamber wall 51 longer than the lower viewing chamber wall 51. The region 62 observed by the sensor 30 is likewise located away from the corners but adjacent to the reflecting structure 61. In the embodiment shown in FIG. 4C, the reflecting structure is comprised of a single reflective surface 60, which reflects the light beam 20 180 degrees (back in the opposite direction), extending orthogonally from the upper viewing chamber wall 51 to the lower viewing chamber wall 52. The region 62 observed is similarly shown in FIG. 4C. This configuration can create a back-flow of diluent if the scattering surface 60 is even slightly absorbing laser light and hence gets warmer in time, thus creating fluid flow by its thermal expansion.

Figure 4C:
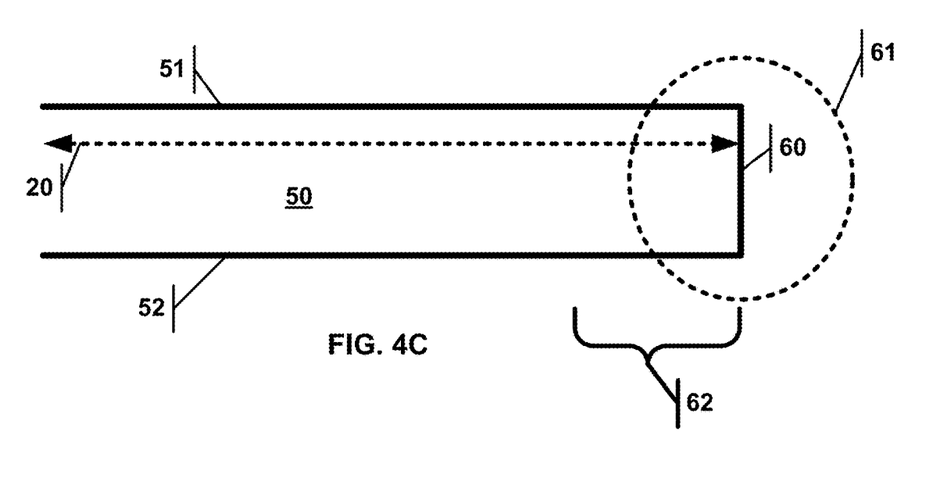
FIG. 4C illustrates a reflecting structure using a mirror placed at 90 degrees relative to the direction of incident light.
Figure 4D:
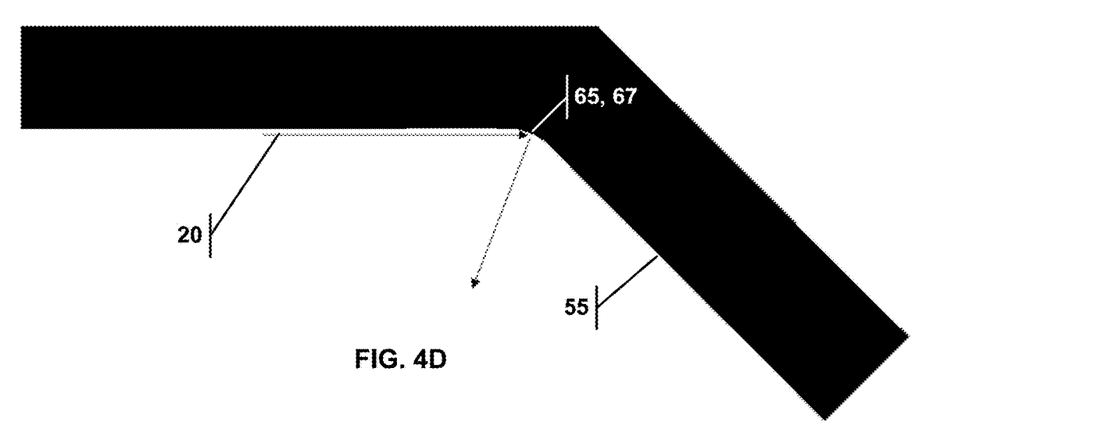
FIG. 4D illustrates the reflection of a beam of light with a rounded 45-degree angle between the chamber wall and a reflective surface.
Figure 4E:
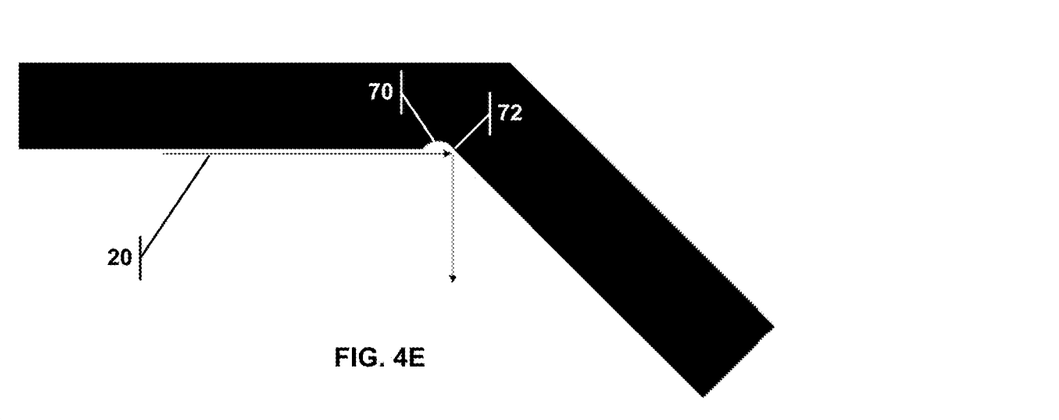
FIG. 4E illustrates the reflection of a beam of light at a 45-degree angle between the chamber wall and a reflective surface using a cavity.

When a ray of electromagnetic energy 20 encounters a rounded reflecting surface 65, as shown in FIG. 4D, and as can be the case when electromagnetic energy 20 travels near the corner joining the first reflecting surface 55 to a viewing chamber wall, it may scatter in a different direction than parallel to the viewing chamber walls 51, 52, as shown by element 67 (stray light beams that do not return into the same volume of observation chamber, thus lowering illumination intensity). The solution to this problem is to use machining to create a notch 70 in the viewing chamber wall where the wall surface transitions to the 45-degree reflective surface 55, as shown in FIG. 4E. With the presence of the notch 70, the incident light 20 would be reflected toward the intended direction, as shown by element 72. Although only one notch is illustrated in FIG. 4E, it would be obvious to one of skill in the art that the notch can be created on one or both surfaces of the viewing chamber walls 51, 52. In other words, the notch or notches 70 could be formed where the first reflecting surface 55 meets the upper viewing chamber wall 51 or where the first reflecting surface 55 meets the lower viewing chamber wall 52, or in both the places where the first reflecting surface 55 meets the viewing chamber walls 51, 52. This problem of light scattering from a rounded corner may also occur in the embodiment of FIG. 4C, so a notch or notches may be formed where the reflecting surface 60 meets the upper viewing chamber wall 51, the lower viewing chamber wall 52, or both 51, 52.

Figure 4F:
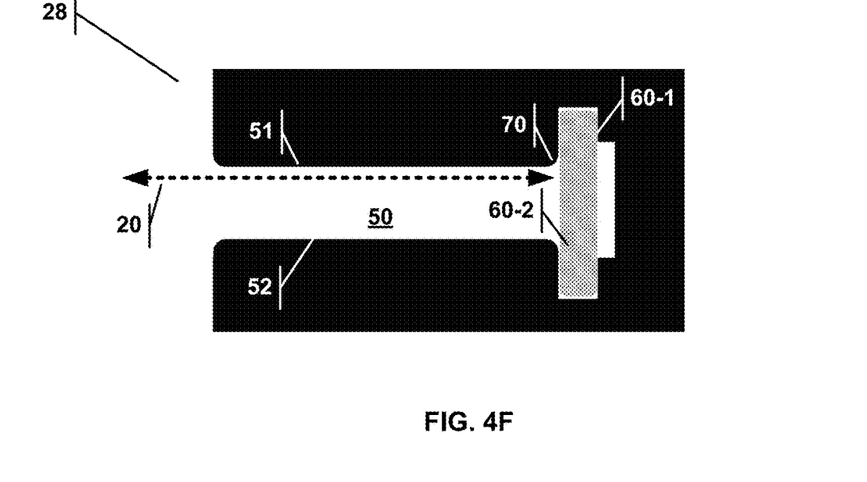
FIG. 4F illustrates a front view of the unique cuvette insert (point of view of a detector) with a slot constructed to receive a mirror.

FIG. 4F illustrates a specially designed cuvette insert 28 that has a mirror slot 60-1 formed at one end of the viewing chamber 50. The insert 28 can be manufactured with the mirror slot 60-1 and notches 70 formed into the upper and lower viewing chamber walls (51, 52). An insertable mirror/ reflecting surface 60-2 can be separately manufactured and inserted into the mirror slot 60-1. The insertable mirror/reflecting surface 60-2 could be specially prepared metal mirror (polished) or even a glass one with metallization on the back. This would prevent absorption and would be easy to manufacture.

In all of these embodiments, the sensor 30 is positioned to detect the electromagnetic energy 20 adjacent to the reflecting structure 61 (to the left of the structure). Experimentation has shown that using a visible laser light (wavelengths between 400 nm and 700 nm), this region extends from approximately 0.5 to 2 millimeters (see above discussion where broadening of scattered light is described) from the reflecting structure 61 for a typical light sheet created by a system of a cylindrical lens f=50 mm and 4× objective and having 50 to 60 microns thickness. This distance is measured to the left from the top notch in the direction away from the 45-degree reflecting surface/mirror 55 in FIG. 4A, measured from the bottom notch in the direction away from the 45-degree reflecting surface/mirror 55 in FIG. 4B, and measured away from the orthogonal reflecting surface/mirror 60 in FIG. 4C.

Previously, it was discussed that the viewing chamber 50 and the structures inside it may be constructed into a cuvette 25, or into a cuvette insert 28 that fits tightly inside a standard cuvette 25. FIGS. 5-12 illustrate other parts of an embodiment of a cuvette insert 28, but it is to be understood that the features described therein may be formed into the cuvette 25 itself instead. In some applications, a cuvette insert 28 is versatile and has its advantages.

Figure 5:
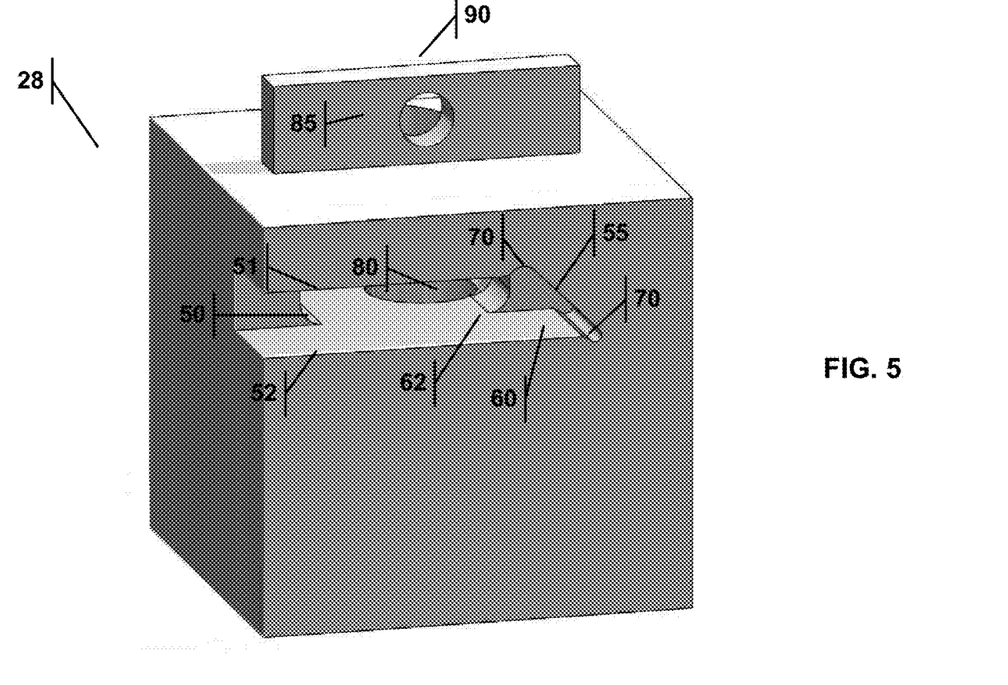
FIG. 5 is an isometric top front view of the unique cuvette insert.

FIG. 5 shows the insert 28 in an isometric front view, which shows the viewing chamber 50 in the front of the isometric top view. This 3-dimensional representation shows an upper viewing chamber wall 51, a lower viewing chamber wall 52, a first reflective surface 55 that extends from the upper viewing chamber wall 51 to the lower viewing chamber wall 52, two notches 70 where the first reflecting surface 55 meets the viewing chamber walls 51, 52, and a second reflecting surface 60 formed into a portion of the lower viewing chamber wall 52. Also visible in FIG. 5 are a mounting structure 85, a sample introduction port 90, and an area where fluid communication 80 between the mixing chamber 75 and the viewing chamber 50 occurs. The mounting structure 85 is shown as a tab with a hole in the Figures, but may instead comprise a hook or any other structure that allows the insert 28 to be easily removed from the cuvette 25 to wash it between samples.

Figure 6:
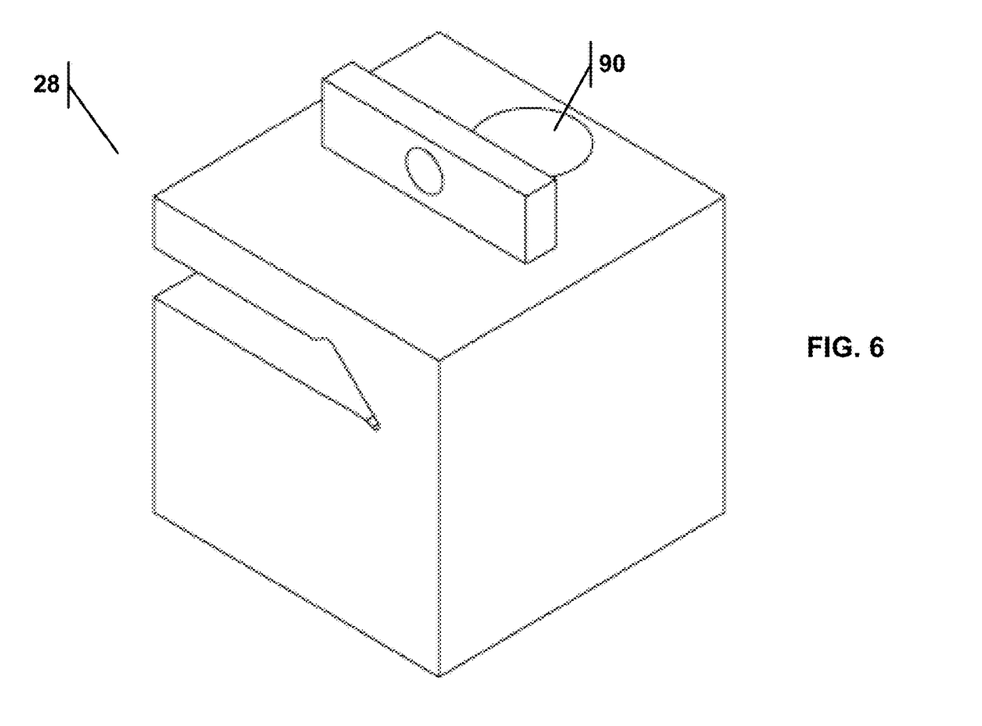
FIG. 6 is an isometric top side view of the unique cuvette insert.

FIG. 6 shows another top isometric view, which offers a better view of the position of the sample introduction port 90, whereby the sample can be introduced into the cuvette insert 28 and thus into the cuvette 25.

Figure 7:
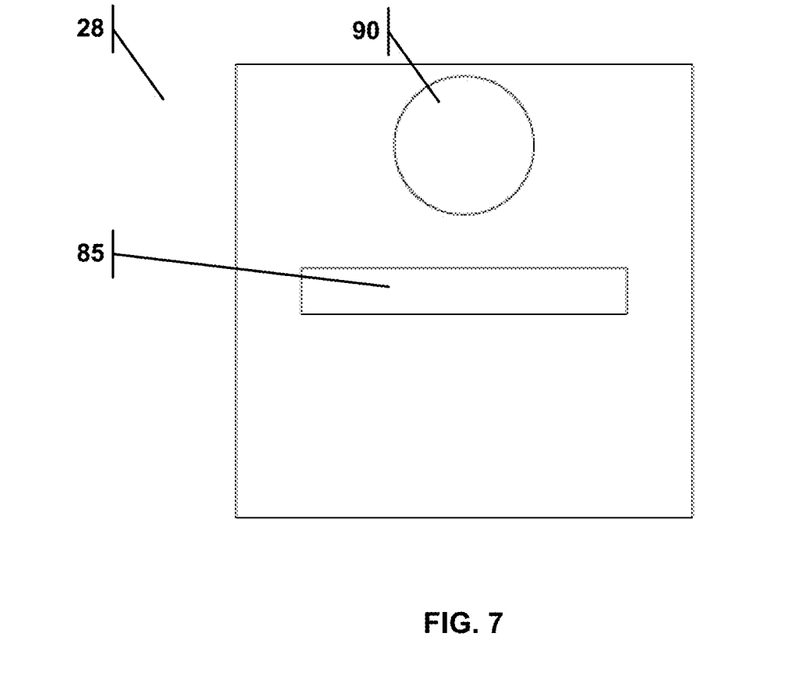
FIG. 7 is a top view of the unique cuvette insert.
Figure 8:
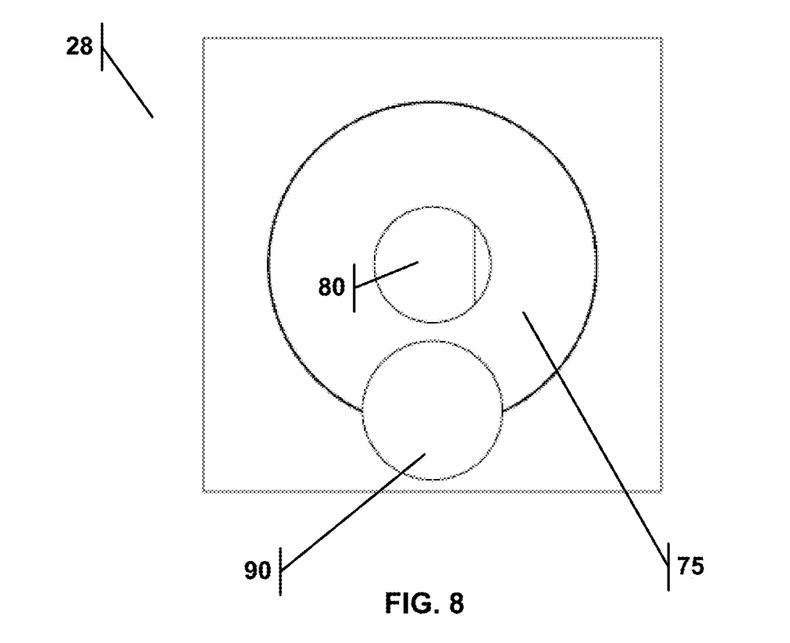
FIG. 8 is a bottom view of the unique cuvette insert.
Figures 9A, 9B:
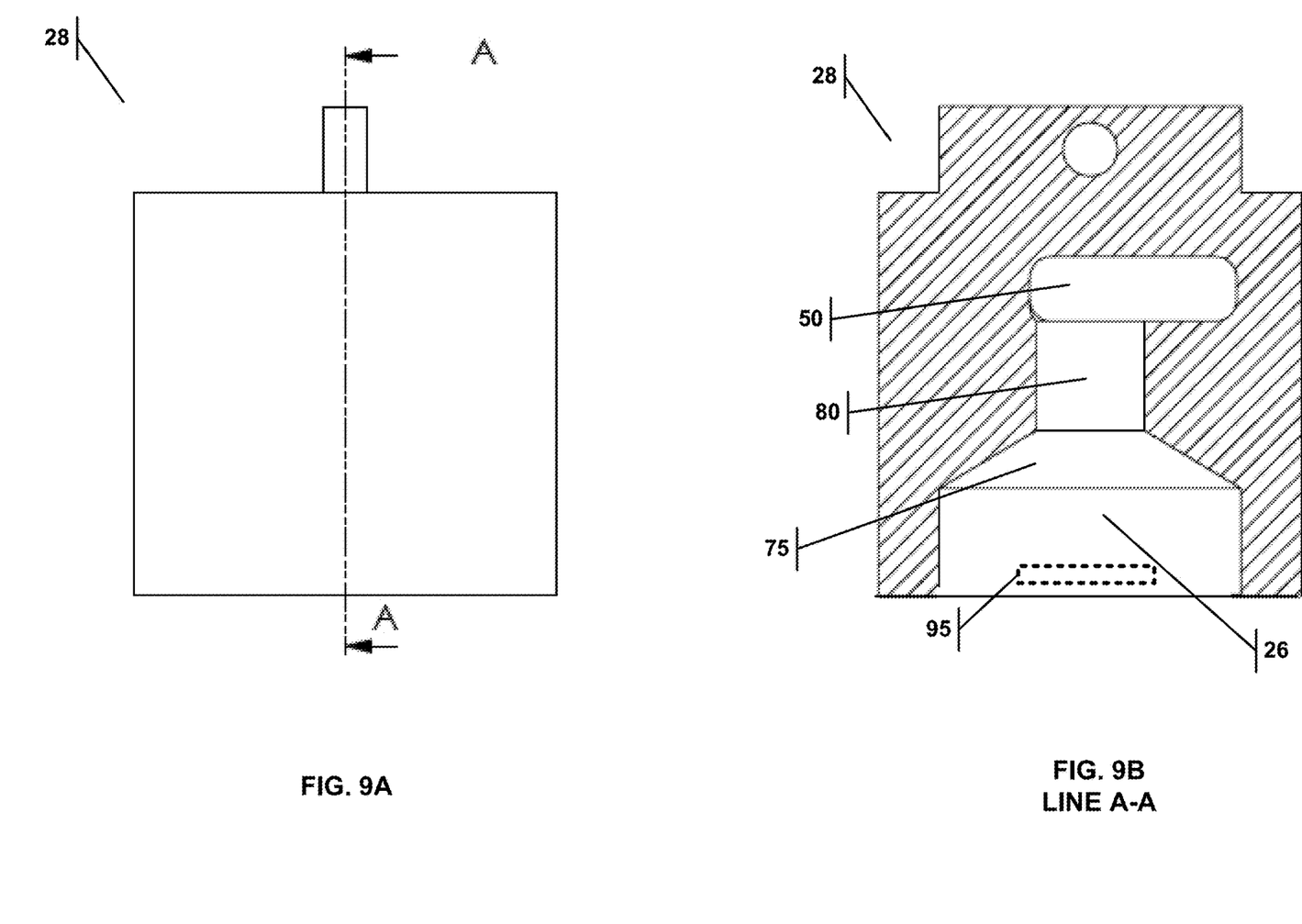
FIG. 9A is a side view showing the sectional line A-A.
FIG. 9B is a cross-sectional view taken along line A-A.

FIG. 7 presents a top view of the cuvette insert 28, and FIG. 8 shows a bottom view. The sample introduction port 90 is fluidly communicative with the mixing chamber 75. There is also visible an area of fluid communication 80 between the mixing chamber 75 and the viewing chamber 50. FIGS. 9A-B presents the side and cross-sectional views of this portion of the cuvette insert 28. The mixing chamber 75 sits below and is separate from the viewing chamber 50. However, there is fluid communication 80 between the mixing chamber 75 and the viewing chamber 50. The mixing chamber 75 may be larger than the viewing chamber 50, and may comprise a mixing stick 95, which may comprise a magnetic stirrer. The shape of the mixing chamber 75 and its fluid communication 80 to the viewing chamber 50 is such that when the mixing stick 95 is moving, it does cause eddies or other currents in the viewing chamber 50, thus allowing for different aliquots to be observed (mixing is done between recording of particles movements).

Figure 10:
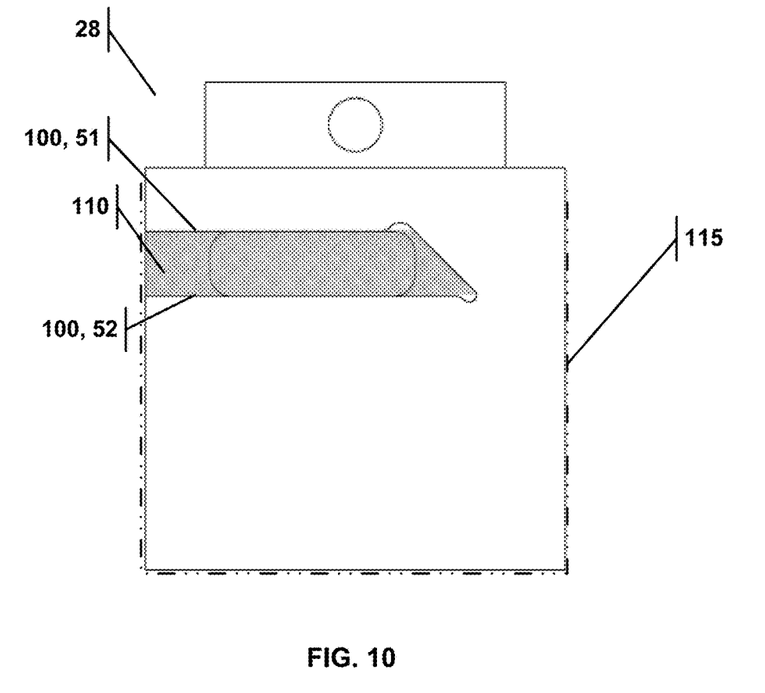
FIG. 10 illustrates a front view of the unique cuvette insert (point of view of a detector).
Figure 11:
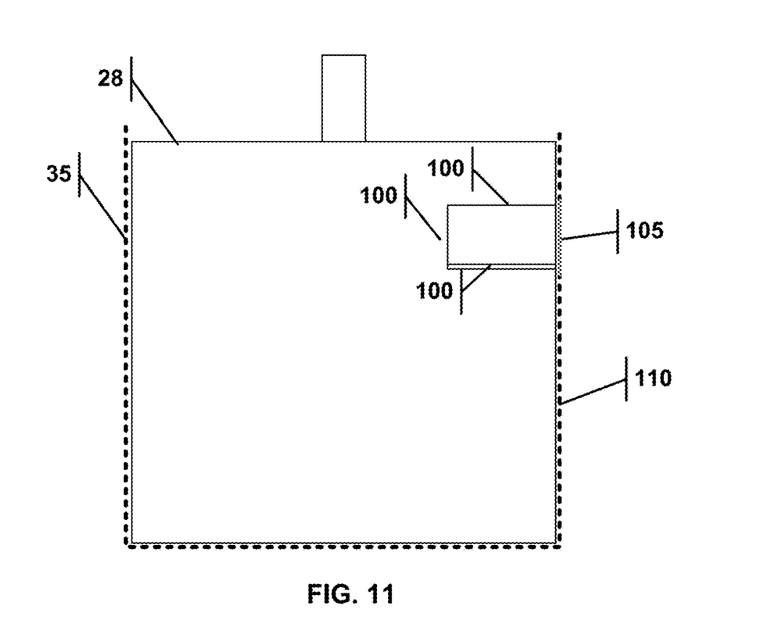
FIG. 11 illustrates a side view of the unique cuvette insert (direction of incident laser light).

FIG. 10 presents a front view of the cuvette insert 28, seen through the exterior wall 35 of a cuvette 25. FIG. 11 shows another side view of the cuvette insert 28.

To further assist with reducing backscattering, the upper and lower and back viewing chamber walls 51, 52 of the insert 28 may be painted black or have another non-reflective surface coating applied 100. The sensor 30 would be placed in a position perpendicular to or orthogonal to the plane of the paper and would be focused on the viewing chamber 50. Also, the surfaces of the insert 28 that are in the same plane of the sensor 30 may be painted black or have another non-reflective coating 100 applied.

The cuvette insert 28 is for use with a cuvette 25 having exterior walls 35 and a floor 40 that defines a volume 26, where at least a portion of the exterior walls 35 is transparent to electromagnetic energy 105, and wherein the volume 26 is adapted to contain a suspension of liquid and particles. The insert 28 comprises an upper viewing chamber wall 51 that extends from the exterior walls 35 of the cuvette 25 and a lowering viewing chamber wall 52 that extends from the exterior walls 35, wherein the upper and lower viewing chamber walls 51, 52 are parallel to each other. The electromagnetic energy 20 is directed into the viewing chamber 50 in a first direction 56 that is parallel to the upper and lower viewing chamber walls 51, 52, and a reflecting structure 61 in the viewing chamber 50 of the insert 28 is constructed to reflect the electromagnetic energy 20 out of the viewing chamber 50 in a second direction 57 that is parallel to the upper and lower viewing chamber walls 51, 52, and the first direction 56 is opposite to the second direction 57. The insert 28 also comprises a mixing chamber 75 separated from and in fluid communication 80 with the viewing chamber 50, and a sample introduction port 90 in fluid communication with the mixing chamber 75.

This insert 28 may have its reflecting structure 61 comprised of a first reflecting surface 55 extending from the upper viewing chamber wall 51 to the lower viewing chamber wall 52 at a 45-degree angle, and a second reflecting surface 60 formed in a portion of the upper view chamber wall 51 (FIG. 4B) or in a portion of the lower viewing chamber wall 52 (FIG. 4A). Further, the insert 28 may comprise a notch or notches 70 where the first reflecting surface 55 meets the upper viewing chamber wall 51, the lower viewing chamber wall 52, or both walls 51, 52, as suggested by FIGS. 4E and 5. Alternatively, the insert's reflecting structure 61 inside the viewing chamber may comprise a reflecting surface 60 extending orthogonally from the upper viewing chamber wall 51 to the lower viewing chamber wall 52 (FIGS. 4C, 4F). Further, the insert 28 may comprise a notch or notches 70, in the embodiment of FIG. 4C, where the reflecting surface 60 meets the upper viewing chamber wall 51, the lower viewing chamber wall 52, or both walls 51, 52. The upper and lower viewing chamber walls 51, 52 have a very low-reflective or non-reflective surface 100. The insert 28 may further comprise a mounting structure 85 adapted to facilitate the insert's installation into and removal from the cuvette 25.

The cuvette insert 28 may be used with a mixing stick 95 in the mixing chamber 75, as shown in FIG. 9B. The mixing chamber 75 may be larger than the viewing chamber 50. The insert 28 may be covered by a thin layer of Teflon or other similar friction-reducing coating 115 (see FIG. 10) that will allow for light to pass through and yet still seal chemically all of the surfaces of the insert 28, so that one need not worry about colloids that can interact with other materials like proteins and aggregate when in contact with metals.

Figure 12A:
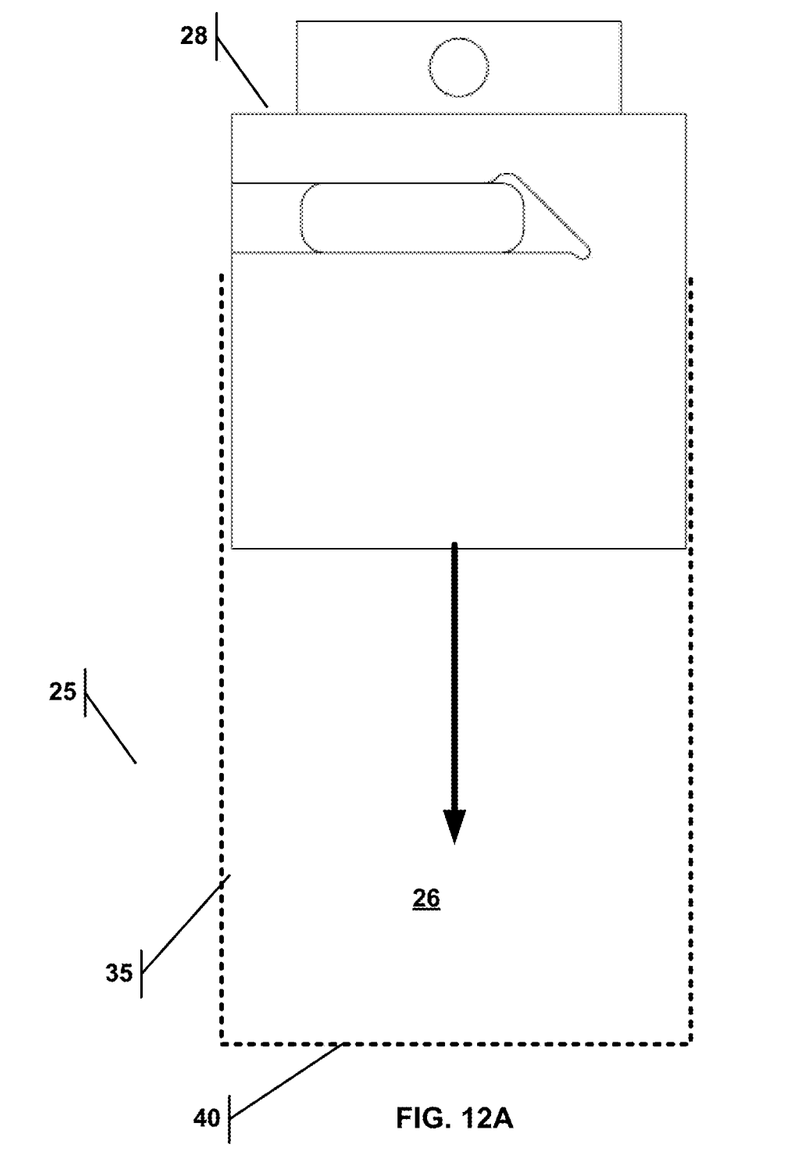
FIG. 12A illustrates the unique cuvette insert being inserted into a cuvette.
Figure 12B:
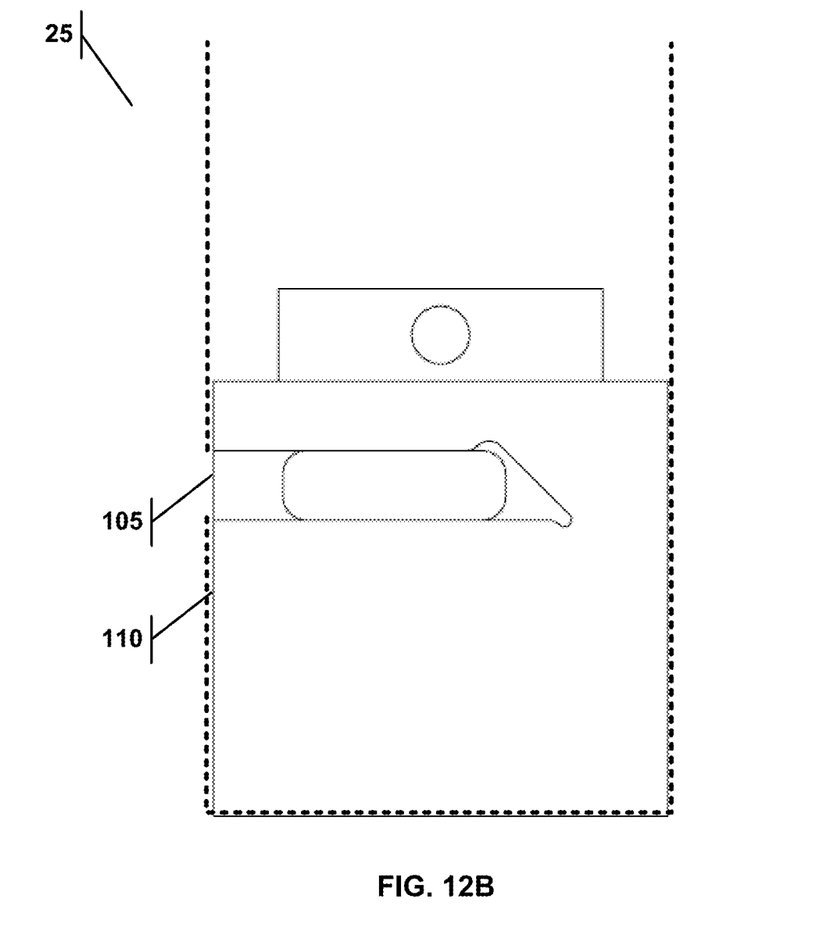
FIG. 12B illustrates the cuvette insert fully inserted in the cuvette.

FIG. 12A illustrates a cuvette insert 28 being inserted into a cuvette 25 having cuvette exterior walls 35, a cuvette floor 40, and a cuvette volume 26. The insert moves downward from the top of the cuvette 25 towards its floor 40, and displaces some cuvette volume 26. In FIG. 12B, the insert 28 is fully inserted and at rest at the bottom of the cuvette 25. An alternative way to look at this figure is that the structures shown in FIGS. 5-11 that illustrate the cuvette insert 28 have been integrated into a cuvette 25, so that they are a non-separable structure. A portion 105 of the cuvette exterior wall 35 could be transparent and made of high-quality optical glass, i.e. the portion of the cuvette exterior wall through which the viewing chamber 50 of the insert 28 would be observed. The second portion 110 of the cuvette exterior wall may be made of a material that is different from the material of the transparent portion 105, such as a more cost-effective material.

Figure 13:
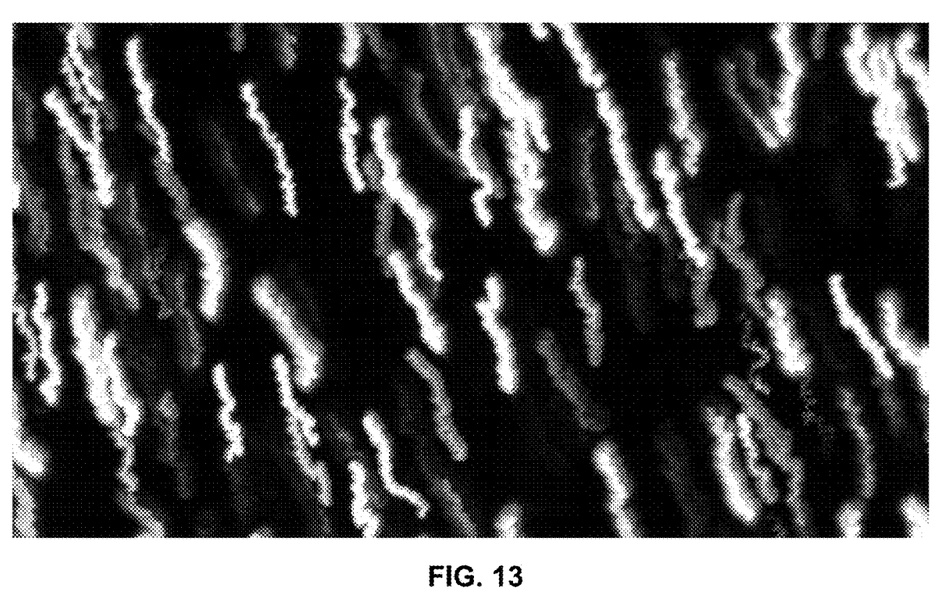
FIG. 13 is a photo showing the convection movement of particles without the use of the cuvette/insert described herein.
Figure 14:
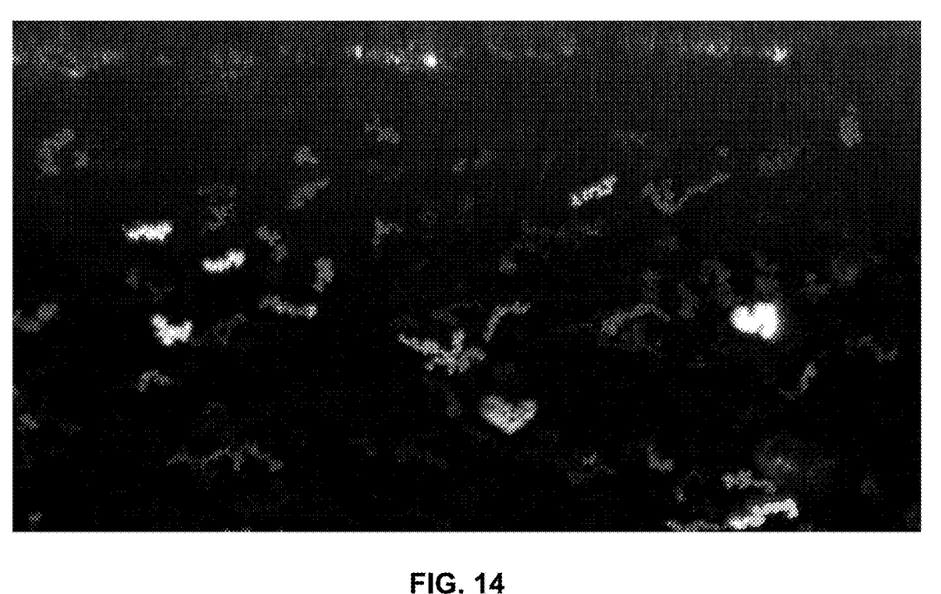
FIG. 14 is a photo showing the movement of particles with the use of the cuvette/insert described herein.

FIGS. 13 and 14 confirm that inserts do work to arrest bulk liquid flow. Both FIGS. 13 and 14 are composite images formed of 300 frames of video, each of which shows particles in motion. In FIG. 13, no insert was used, which illustrates how particles move primarily with the bulk liquid flow in a substantially linear direction that is common to all the particles. In FIG. 14, an insert is used, which illustrates how bulk liquid flow is eliminated such that the only particle movement is through Brownian motion, with no discernable pattern common to all the particles. The conditions and the sample are the same as between FIGS. 13 and 14—the only change is the inclusion of an insert as disclosed herein.

While the systems, methods and structures described herein have made reference to viewing and analyzing nanoparticles, these same systems, methods and structures may be used for larger particle dimensions, such as micron-sized particles.

Although exemplary embodiments and applications of the invention have been described herein including as described above and shown in the included example Figures, there is no intention that the invention be limited to these exemplary embodiments and applications or to the manner in which the exemplary embodiments and applications operate or are described herein. Indeed, many variations and modifications to the exemplary embodiments are possible, as would be apparent to a person of ordinary skill in the art. The invention may include any device, structure, method, or functionality, as long as the resulting device, system or method falls within the scope of one of the claims that are allowed by the patent office based on this or any related patent application.

The invention claimed is:

1. A system for viewing nanoparticles, the system comprising:
   a light source for generating an electromagnetic energy directed at a cuvette;
   a sensor for detecting electromagnetic energy within the cuvette;
   wherein the cuvette comprises:
      exterior walls and a floor that define a volume, wherein at least a portion of the exterior walls is transparent to the electromagnetic energy, and wherein the volume is adapted to contain a suspension fluid and the nanoparticles;
      a viewing chamber comprising:
         an upper viewing chamber wall extending from the exterior walls and a lower viewing chamber wall extending from the exterior walls, wherein the upper and lower viewing chamber walls are substantially parallel to each other;
         wherein the electromagnetic energy is directed into the viewing chamber in a first direction that is parallel to the upper and lower viewing chamber walls; and
         a reflecting structure constructed to reflect the electromagnetic energy out of the viewing chamber in a second direction that is parallel to the upper and lower viewing chamber walls, wherein the first direction is opposite to the second direction;
      a mixing chamber separated from and in fluid communication with the viewing chamber; and
      a sample introduction port in fluid communication with the mixing chamber;
   and wherein the sensor is positioned to detect electromagnetic energy in a region adjacent to the reflecting structure, and the detected electromagnetic energy travels perpendicularly to the first direction.

2. The system of claim 1, wherein the reflecting structure comprises:
   a first reflecting surface extending from the upper viewing chamber wall to the lower viewing chamber wall at a 45-degree angle; and
   a second reflecting surface formed in a portion of the upper viewing chamber wall or in a portion of the lower viewing chamber wall.

3. The system of claim 2, further comprising a notch or notches where the first reflecting surface meets the upper viewing chamber wall, the lower viewing chamber wall, or both.

4. The system of claim 1, wherein the reflecting structure comprises:
   a reflecting surface extending orthogonally from the upper viewing chamber wall to the lower viewing chamber wall.

5. The system of claim 4, further comprising a notch or notches where the reflecting surface meets the upper viewing chamber wall, the lower viewing chamber wall, or both.

6. The system of claim 1, wherein the reflecting structure comprises an insertable reflecting surface, and wherein the viewing chamber comprises a mirror slot constructed to receive the insertable reflecting surface.

7. The system of claim 6, wherein the mirror slot is formed into the upper viewing chamber wall and the lower viewing chamber wall.

8. The system of claim 1, wherein the mixing chamber comprises a mixing stick.

9. The system of claim 1, wherein the upper and lower viewing chamber walls have a very low-reflective or non-reflective surface.

10. The system of claim 1, wherein the mixing chamber is larger than the viewing chamber.

11. The system of claim 1, wherein the transparent portion of the exterior walls is made of a high-quality optical glass.

12. The system of claim 1, wherein a second portion of the exterior walls is made of a material that is different from the transparent portions.

13. An insert for a cuvette, wherein the cuvette comprises exterior walls and a floor that together defines a volume, wherein at least a portion of the exterior walls is transparent to electromagnetic energy, and wherein the volume is adapted to contain a suspension liquid and particles, the insert comprising:
   an upper viewing chamber wall that extends from the exterior walls and a lower viewing chamber wall extending from the exterior walls, wherein the upper and lower viewing chamber walls are substantially parallel to each other;

wherein the electromagnetic energy is directed into the viewing chamber in a first direction that is parallel to the upper and lower viewing chamber walls;

a reflecting structure constructed to reflect the electromagnetic energy out of the viewing chamber in a second direction that is parallel to the upper and lower viewing chamber walls, wherein the first direction is opposite to the second direction;

a mixing chamber separated from and in fluid communication with the viewing chamber; and a sample introduction port in fluid communication with the mixing chamber.

14. The insert of claim 13, wherein the reflecting structure comprises:
   a first reflecting surface extending from the upper viewing chamber wall to the lower viewing chamber wall at a 45-degree angle; and
   a second reflecting surface formed in a portion of the upper viewing chamber wall or in a portion of the lower viewing chamber wall.

15. The insert of claim 14, further comprising a notch or notches where the first reflecting surface meets the upper viewing chamber wall, the lower viewing chamber wall, or both.

16. The insert of claim 13, wherein the reflecting structure comprises:
   a reflecting surface extending orthogonally from the upper viewing chamber wall to the lower viewing chamber wall.

17. The insert of claim 16, further comprising a notch or notches where the reflecting surface meets the upper viewing chamber wall, the lower viewing chamber, or both.

18. The insert of claim 13, wherein the reflecting structure comprises an insertable reflecting surface, and wherein the viewing chamber comprises a mirror slot constructed to receive the insertable reflecting surface.

19. The insert of claim 18, wherein the mirror slot is formed into the upper viewing chamber wall and the lower viewing chamber wall.

20. The insert of claim 13, wherein the upper and lower viewing chamber walls have a very low-reflective or non-reflective surface.

21. The insert of claim 13, wherein the mixing chamber is larger than the viewing chamber.

22. The insert of claim 13, further comprising a mounting structure adapted to facilitate the insert's installation into and removal from the cuvette.

23. The insert of claim 13, wherein surfaces of the insert are covered by a thin layer of coating that chemically seals the surfaces.

24. The insert of claim 23, wherein the coating sealing the surfaces of the insert allows electromagnetic energy to pass through.

* * * * *